(12) United States Patent
Chopade et al.

(10) Patent No.: US 10,259,991 B2
(45) Date of Patent: Apr. 16, 2019

(54) MULTIFUNCTIONAL PROPPANT FOR FRACTURING APPLICATIONS

(71) Applicant: HALLIBURTON ENERGY SERVICES INC., Houston, TX (US)

(72) Inventors: Prashnat D. Chopade, Kingwood, TX (US); Phillip D. Nguyen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/563,484

(22) PCT Filed: May 15, 2015

(86) PCT No.: PCT/US2015/031141
§ 371 (c)(1),
(2) Date: Sep. 29, 2017

(87) PCT Pub. No.: WO2016/186621
PCT Pub. Date: Nov. 24, 2016

(65) Prior Publication Data
US 2018/0086972 A1    Mar. 29, 2018

(51) Int. Cl.
*C09K 8/80* (2006.01)
*C09K 8/60* (2006.01)
*E21B 43/267* (2006.01)
*C09K 8/66* (2006.01)
(Continued)

(52) U.S. Cl.
CPC .............. *C09K 8/805* (2013.01); *C09K 8/605* (2013.01); *C09K 8/665* (2013.01); *C09K 8/685* (2013.01); *C09K 8/706* (2013.01); *E21B 43/267* (2013.01); *C09K 2208/10* (2013.01); *C09K 2208/26* (2013.01)

(58) Field of Classification Search
CPC . C09K 8/80; C09K 8/805; C09K 8/60; C09K 8/605; C09K 2208/10; C09K 2208/26; E21B 43/26; E21B 43/267
See application file for complete search history.

(56) References Cited

U.S. PATENT DOCUMENTS 6,209,643 B1 *  4/2001  Nguyen ............... C09K 8/5086
                                                        166/276
6,311,773 B1   11/2001  Todd et al.
(Continued)

FOREIGN PATENT DOCUMENTS

WO        2013158308 A1    10/2013

OTHER PUBLICATIONS

International Search Report and Written Opinion; PCT Application No. PCT/US2015/031141; dated Feb. 15, 2016.

*Primary Examiner* — Zakiya W Bates
*Assistant Examiner* — Crystal J Miller
(74) *Attorney, Agent, or Firm* — Polsinelli PC

(57) ABSTRACT

Multifunctional proppants made up of proppant particles that are at least partially coated by a biocide, a breaker, and a cross-linking agent. These components can be positioned around the proppant particles so they function in a sequential or time-release manner. The multifunctional proppants can be provided in fracturing fluids to form or maintain one or more fractures in a subterranean zone penetrated by a well bore and which can minimize or inhibiting bacterial growth.

21 Claims, 3 Drawing Sheets

(51) Int. Cl.
*C09K 8/68* (2006.01)
*C09K 8/70* (2006.01)

(56) References Cited

U.S. PATENT DOCUMENTS

| | | | |
|---|---|---|---|
| 7,228,904 B2 * | 6/2007 | Todd | C09K 8/80 |
| | | | 166/280.1 |
| 9,279,077 B2 * | 3/2016 | Liang | C09K 8/805 |
| 9,840,660 B2 * | 12/2017 | Chopade | C09K 8/685 |
| 9,840,902 B2 * | 12/2017 | Nguyen | E21B 43/267 |
| 2005/0126780 A1 * | 6/2005 | Todd | C09K 8/80 |
| | | | 166/279 |
| 2008/0119375 A1 * | 5/2008 | Barmatov | A01N 59/16 |
| | | | 507/270 |
| 2012/0279704 A1 | 11/2012 | Eoff et al. | |
| 2013/0048282 A1 * | 2/2013 | Adams | E21B 43/267 |
| | | | 166/279 |
| 2013/0196884 A1 * | 8/2013 | Kakadjian | C09K 8/805 |
| | | | 507/203 |
| 2014/0131041 A1 * | 5/2014 | Liang | C09K 8/805 |
| | | | 166/280.2 |
| 2014/0309149 A1 | 10/2014 | McDaniel et al. | |
| 2014/0318779 A1 * | 10/2014 | Welton | E21B 43/267 |
| | | | 166/280.2 |
| 2014/0332213 A1 | 11/2014 | Zhou et al. | |
| 2016/0130499 A1 * | 5/2016 | Nguyen | C09K 8/805 |
| | | | 166/280.2 |
| 2016/0177175 A1 * | 6/2016 | Kakadjian | C09K 8/805 |
| | | | 507/209 |
| 2016/0319186 A1 * | 11/2016 | Chopade | C09K 8/508 |
| 2017/0313931 A1 * | 11/2017 | Chopade | C09K 8/706 |

* cited by examiner

MULTIFUNCTIONAL PROPPANT FOR FRACTURING APPLICATIONS

CROSS-REFERENCE TO RELATED APPLICATIONS

This application is a national stage entry of PCT/US2015/031141 filed May 15, 2015, said application is expressly incorporated herein in its entirety.

FIELD

The present disclosure relates to a multifunctional proppant, fracturing fluids comprising the multifunctional proppant, and to methods for making and using the multifunctional proppant.

BACKGROUND

In order to produce oil or gas, a well is drilled into a subterranean formation, which may be a reservoir or adjacent to a reservoir. Various types of treatments are commonly performed on a well or subterranean formation. For example, stimulation is a type of treatment performed on a well or subterranean formation to restore or enhance the productivity of oil and gas from the well or subterranean formation. Stimulation treatments fall into two main groups; hydraulic fracturing and matrix treatments. Fracturing treatments are performed above the fracture pressure of the subterranean formation to create or extend a highly-permeable flow path between the formation and the wellbore. Other types of treatments include, for example, controlling excessive water production and sand control.

A well or subterranean formation is normally treated with a treatment fluid. A treatment fluid is typically adapted to be used to resolve a specific purpose, such as stimulation, isolation, or control of reservoir gas or water. "Hydraulic fracturing," sometimes simply referred to as "fracturing," is a common stimulation treatment. A treatment fluid adapted for this purpose is sometimes referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

To fracture a subterranean formation typically requires hundreds of thousands of gallons of fracturing fluid. Further, it is often desirable to fracture at more than one downhole location of a well. Thus, a high volume of fracturing fluid is usually required to treat a well, which means that a low-cost fracturing fluid is desirable. Because of the ready availability and relative low cost of water compared to other liquids, a fracturing fluid is usually water-based.

When a fracture is formed or extended, fracturing fluid suddenly has a fluid flow path to flow more rapidly away from the wellbore. As soon as the fracture is created or enhanced, the sudden increase in the flow of fluid away from the well reduces the pressure in the well. Thus, the creation or enhancement of a fracture in the formation is indicated by a sudden drop in fluid pressure, which can be observed at the wellhead.

Newly-created or extended fractures tend to close after the pumping of the fracturing fluid is stopped. To prevent the fracture from closing, a material must be placed in the fracture to keep the fracture propped open. A material used for this purpose is referred to as a "proppant." The proppant is in the form of a solid particulate, which can be suspended in the fracturing fluid, carried downhole, and deposited in the fracture as a "proppant pack." The proppant pack props the fracture in an open condition while allowing fluid flow through the permeability of the pack.

A number of types of bacteria can be natively present in a subterranean formation, or they can be introduced into a subterranean formation in the course of drilling and completing a wellbore. The elevated temperatures of the subterranean environment can readily promote rapid bacterial growth. In addition, a number of treatment fluids contain materials that are ready food sources for some bacteria, which can further exacerbate bacterial growth issues.

Due to a number of undesirable consequences, it can often be desirable to suppress the propagation of bacteria within a subterranean environment and/or in a treatment fluid being introduced into a subterranean environment. Growth of bacterial colonies within a subterranean formation can produce sludge or slime within the formation and decrease the formation's porosity. Decreased porosity can lower production of a hydrocarbon resource from the formation. Sulfate-reducing bacteria can be particularly problematic within a subterranean environment, since they release hydrogen sulfide as a metabolic product. Hydrogen sulfide can result in corrosion of downhole metal goods, produce deleterious health effects, and lessen the quality of a produced hydrocarbon resource. When hydrogen sulfide or sulfur-containing organic compounds are present in a produced hydrocarbon resource, for example, costly refining techniques may be required in order to make the hydrocarbon resource suitable for its intended end use. Bacterial growth can also degrade certain components within a treatment fluid, such as viscosifying polymers, thereby changing the treatment fluid's properties and possibly making the treatment fluid unsuitable for its originally intended purpose.

Because of the serious consequences bacteria can produce in a subterranean environment, a number of techniques are used to suppress bacterial growth downhole. Continuous or pulsed ultraviolet light sources may be used for this purpose, but bacterial growth may resume if the bacteria are not all killed or inactivated by the light source. Similarly, chemical biocides may be used to suppress bacterial growth in a subterranean formation or in a treatment fluid. Although chemical biocides can be effective against various types of bacteria, it is often difficult to maintain the biocide in a desired location downhole. For example, chemical biocides can exit the subterranean environment during flowback of a treatment fluid, again allowing bacterial growth to resume if the bacteria are not all killed or inactivated.

Bacterial growth within the recesses of a subterranean formation can be particularly difficult to suppress. Specifically, it can be difficult to deliver a chemical biocide or an ultraviolet light treatment into inaccessible subterranean regions, such as the regions within and beyond propped fractures of a subterranean formation. In addition, conveying a chemical biocide through previously propped fractures can upset placement of the proppant, potentially undoing the effects of a fracturing operation and reducing the formation's permeability.

BRIEF DESCRIPTION OF THE DRAWINGS

Implementations of the present technology will now be described, by way of example only, with reference to the attached figures, wherein.

Figure 1:
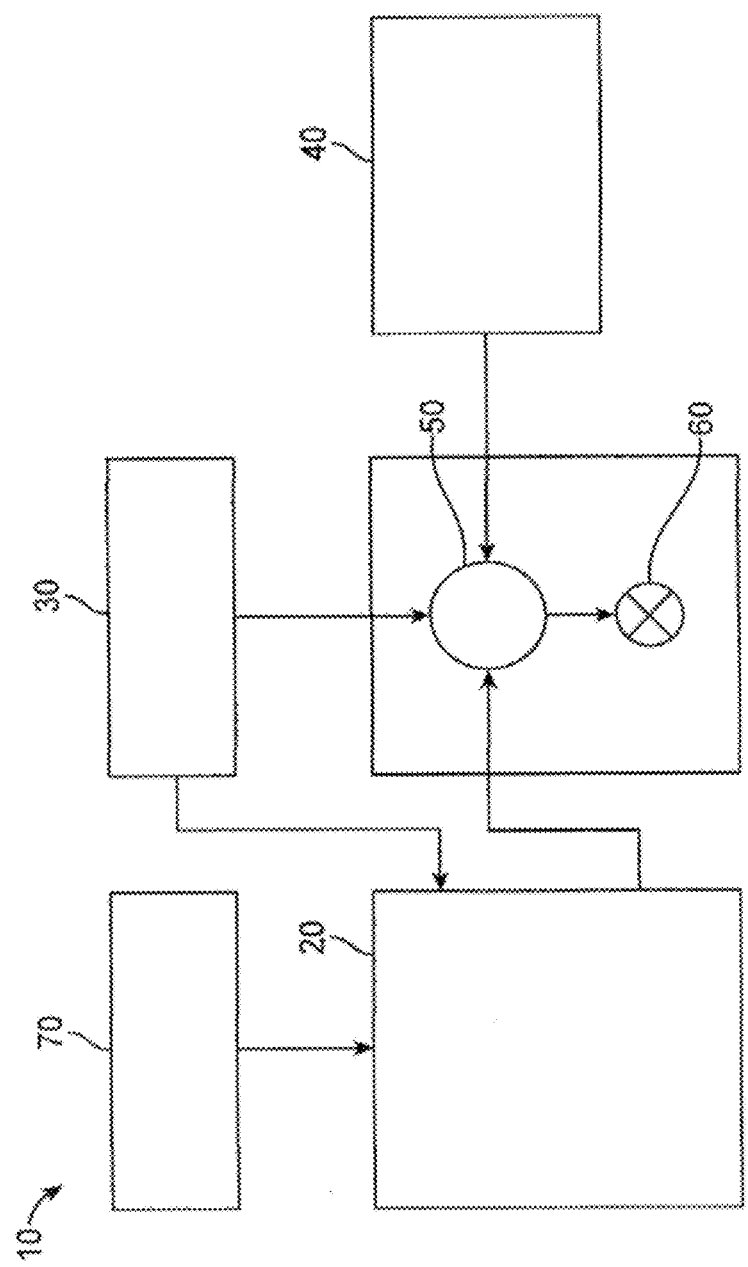
FIG. 1 is a diagram illustrating an example of a fracturing system that may be used in association with certain aspects of the present disclosure.

It should be understood that the various aspects are not limited to the arrangements and instrumentality shown in the drawings.

DETAILED DESCRIPTION

The present disclosure relates to multifunctional proppants comprising proppant particles that are at least partially coated with or attached to functional components such as biocide, a breaker, and a cross-linking agent. The different components of the multifunctional proppants perform different actions. Therefore, the proppants of the instant disclosure are referred to as "multifunctional," i.e., they are capable of carrying out multiple functions. The functional components can act sequentially and/or in a time-release manner. Binders such as resins and tackifying agents can be used to coat or connect the functional components to proppant particles. The various binders can help the various functional components release or become available and/or active at different times and/or locations throughout the fracturing process.

The proppant particles which form the base of the multifunctional proppants can be any proppant particle known in the art. For example, well known and commonly used proppants include sand, bauxite, ceramic materials, glass materials, polymer materials, polytetrafluoroethylene material, nut shell piece, cured resinous particulate comprising nut shell pieces, seed shell pieces, cured resinous particulate comprising seed shell pieces, fruit pit pieces, cured resinous particulate comprising fruit pit pieces, woods, composite particulates, etc.

A resin or tackifying agent can be used to attach a biocide to the proppant particles. The resin and/or tackifying agent can form a coating that at least partially covers the proppant particles. In some instances, the biocide comprises or consists of biocidal nanoparticles. For example, the biocidal nanoparticles may be metal nanoparticles, metal oxide nanoparticles, metal halide nanoparticles, non-metal nanoparticles, or any combination thereof. More specifically, examples of biocidal nanoparticles include, but are not limited to, silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, and any combination thereof. In some cases, the biocide is not a biocidal nanoparticle. The biocide can be, for example, an oxidizing biocide or a nonoxidizing biocide.

The multifunctional proppant particles further contain a breaker, which can also be attached to the proppant particle with a tackifying agent or resin. The breaker can be combined in the same layer as the biocide or can be included in a separate and distinct layer. In some cases, the breaker may be positioned outside of the biocide so that the breaker can interact with the fracturing fluid before the biocide becomes available for preventing bacterial growth. The breaker may be, for example, an oxidative breaker, an acid breaker, a delayed release acid breaker, a delayed release enzyme breaker, a temperature activated breaker, a hydrolysable ester breaker, or any combination thereof.

In some cases the multifunctional proppant particles further include a cross-linking agent. When a cross-linking agent is used, it is often applied on top of (on the outside of) the biocide and breaker so that it can be available to interact with fracturing fluid before the breaker and biocide become available to interact with the fracturing fluid. The cross-linking agent may also (or alternatively) be included in a binder or carrier coating that at least partially covers the proppant particles. The binder or carrier may allow for the early release of the cross-linking agent from the multifunctional proppant particles. The cross-linking agent thickens the fracturing fluid so that the viscosity is high enough to carry the proppant particle to a desired location. Examples of cross-linking agents include, but are not limited to, an alkali metal borate, borax, boric acid, and a compound which is capable of releasing multivalent metal ions in aqueous solutions.

As mentioned previously, the functional components of the multifunctional proppant particles (biocide, breaker, cross-linking agents, etc.) can be combined and applied to the proppant particles in various combinations with each other or separately. For instance, in some cases, it may be desirable that the biocide is permanently affixed to the proppant particle so that it is continuously available for inhibiting bacterial growth around the proppant particle after the proppant particle is placed within a desired location in a fracture. Likewise, it may be desirable for the cross-linking agent to be available to cross-link gelling agents in the fracturing fluid quickly in order to thicken the fracturing fluid so that it can carry the proppant particles to a desired location. After the proppant particles are placed in desired locations, the breaker may become available to "break" or "fluidize" the fracturing fluid so it can be easily removed. A "time-release" nature of the multifunctional proppant particles can be achieved by applying the multifunctional components in various layers or locations relative to one another. Likewise, the "time-release" nature of the multifunctional proppant particles can be achieved by combining individual components with various carrier types (e.g., tackifying agents and/or resins) that allow for their sequential release (or allow for them to become available if not actually released) from the proppant particle at the desired time.

In some instances, one or more of the multifunctional components of the multifunctional proppant particles (biocide, breaker, cross-linking agents, etc.) are attached to the proppant particle with a resin. In addition to the various resins described in detail below, in some instances, the resin is a liquid bisphenol A-epichlorohydrin resin, a 4,4'-diaminodiphenyl sulfone hardening agent dissolved in a diethylene glycol monomethyl ether solvent, a silane coupling agent, and a surfactant for facilitating the coating of the resin on the proppant particle. In some cases, one or more of the multifunctional components of the multifunctional proppant particles (biocide, breaker, cross-linking agents, etc.) are attached to the proppant particle with a tackifying agent. In addition to the various tackifying agents described in detail below, in some cases the tackifying agent is predominately a condensation reaction product of a dimer acid containing some trimer and higher oligomers and some monomer acids with a polyamine. The polyamine may be, for example, an ethylenediamine, diethylenetriamine, triethylenetetraamine, tetraethylene pentaamine and aminoethylipiperazine.

The multifunctional proppant particles are useful for forming one or more fractures in a subterranean zone penetrated by a well bore and for minimizing or inhibiting bacterial growth therein. The multifunctional proppant particles are typically added to a fracturing fluid, which is then introduced into a subterranean zone to form one or more fractures and to deposit the proppant particles therein. The fracturing fluid will typically contain from about 0.1 lbm to 20 lbm, or from about 0.5 lbm to about 15 lbm, or from about 1 lbm to about 10 lbm, of the multifunctional proppant per gallon of fracturing treatment fluid. Typically, the cross-linking agent cross-links a gelling agent in the fracturing fluid for a sufficient amount of time to allow the fracturing fluid to carry the proppant particle to the desired location. After being properly deposited, the breaker component of the multifunctional proppant particles fluidizes the fracturing fluid for removal. Finally, the biocide acts to prevent bacterial growth around the proppant particles, thereby allowing the flow of hydrocarbons to continue without becoming impeded by the build-up of bacterial growth.

Specific types of multifunctional components (proppants, biocides, breakers, cross-linking agents, resins, tackifying agents, etc.) are described in more detail below. Also included are specific ranges and combinations. Finally, illustrations and examples are also provided.

Proppants

Illustrative proppant particulates that may be used in conjunction with the instant disclosure include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. The mean particulate size of the proppant particulates generally may range from about 2 mesh to about 400 mesh on the U.S. Sieve Series, although other sizes or mixtures of sizes may be desirable in certain situations. The proppant particulates may be substantially spherical materials, fibrous materials, polygonal materials (such as cubic materials), irregular shapes, and any combination thereof.

The proppant particles utilized in accordance with the present disclosure are generally of a size such that formation particulate solids which migrate with produced fluids are prevented from being produced from the subterranean zone. Generally, the proppant particles have a size in the range of from about 2 to about 400 mesh, U.S. Sieve Series. In some cases, the proppant is graded sand having a particle size in the range of from about 10 to about 70 mesh, U.S. Sieve Series. Sand particle size distribution ranges are one or more of 10-20 mesh, 20-40 mesh, 40-60 mesh or 50-70 mesh, depending on the particular size and distribution of formation solids to be screened out by the consolidated proppant particles.

Resins and Tackifying Accents

The biocides and other components of the instant multifunctional proppants are typically attached to the proppant particles using a resin, such as a hardenable or curable resin, and/or a tackifying agent, wherein the resin and/or tackifying agent can bind, coagulate, or flocculate a particulate. In some cases the tackifying agent may be aqueous but in other cases the tackifying agent may be non-aqueous. Examples of aqueous tackifying agents include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some cases, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers may include, but are not limited to, dialkyl amino alkyl (meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Non-aqueous tackifying agents may comprise, for example, polyamides that are liquids or in solution at the temperature of the subterranean formation such that they are, by themselves, non-hardening when introduced into the subterranean formation. For example, in some cases the product is a condensation reaction product comprised of a polyacid and a polyamine. Such products may include compounds such as combinations of dibasic acids containing some trimer and higher oligomers and also small amounts of monomer acids that are reacted with polyamines. Other polyacids may include trimer acids, synthetic acids produced from fatty acids, maleic anhydride, acrylic acid, and the like. Combinations of these may be suitable as well.

Additional compounds which may be used as non-aqueous tackifying agents may include liquids and solutions of, for example, polyesters, polycarbonates, silyl-modified polyamide compounds, polycarbamates, urethanes, natural resins such as shellac, and the like. Combinations of these may be suitable as well.

Non-aqueous tackifying agents suitable for use may either be used such that they form a non-hardening coating on a particulate surface or they may be combined with a multifunctional material capable of reacting with the non-aqueous tackifying agent to form a hardened coating. A "hardened coating," as used herein, means that the reaction of the non-aqueous tackifying compound with the multifunctional material should result in a substantially non-flowable reaction product that exhibits a higher compressive strength in a consolidated agglomerate than the non-aqueous tackifying compound alone with the particulates. In this instance, the non-aqueous tackifying agent may function similarly to a hardenable resin.

In some cases, the binder material may comprise a curable resin. As used herein, the term "resin" will refer to any of numerous physically similar polymerized synthetics or chemically modified natural resins including thermoplastic materials and thermosetting materials. Resins that may be suitable for use in the present disclosure may include substantially all resins known and used in the art.

One type of resin suitable for use in the present disclosure is a two-component epoxy-based resin comprising a liquid hardenable resin component and a liquid hardening agent component. The liquid hardenable resin component comprises a hardenable resin and an optional solvent. The solvent may be added to the resin to reduce its viscosity for ease of handling, mixing and transferring. An alternate way to reduce the viscosity of the hardenable resin is to heat it. The second component is the liquid hardening agent component, which comprises a hardening agent, an optional silane coupling agent, a surfactant, an optional hydrolyzable ester, and an optional liquid carrier fluid.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, the like and any combination thereof. In some cases, the hardenable resin may comprise a urethane resin.

The hardenable resin may be included in the liquid hardenable resin component in an amount ranging between about 5% to about 100% by weight of the liquid hardenable resin component. It is within the ability of one having ordinary skill in the art and the benefit of this disclosure to determine how much of the liquid hardenable resin component may be needed to achieve desired results. Factors that may affect this decision include which type of liquid hardenable resin component and liquid hardening agent component are used.

Examples of hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; and 2-ethyl-4-methyl imidazole; and combinations thereof. The chosen hardening agent often effects the range of temperatures over which a hardenable resin is able to cure. By way of example, and not limitation, in subterranean formations having a temperature of about 60° F. to about 250° F., amines and cyclo-aliphatic amines such as piperidine, triethylamine, tris(dimethylaminomethyl) phenol, and dimethylaminomethyl)phenol may be used. In subterranean formations having higher temperatures, 4,4'-diaminodiphenyl sulfone may be a suitable hardening agent.

A hardening agent may be included in the liquid hardening agent component in an amount sufficient to at least partially harden the resin composition. In some cases, the hardening agent used is included in the liquid hardening agent component in the range of about 0.1% to about 95% by weight of the liquid hardening agent component. In other cases, the hardening agent used may be included in the liquid hardening agent component in an amount of about 15% to about 85% by weight of the liquid hardening agent component. In other cases, the hardening agent used may be included in the liquid hardening agent component in an amount of about 15% to about 55% by weight of the liquid hardening agent component.

In some cases, the binder material may comprise a liquid hardenable resin component emulsified in a liquid hardening agent component, wherein the liquid hardenable resin component is the internal phase of the emulsion and the liquid hardening agent component is the external phase of the emulsion. In other cases, the liquid hardenable resin component may be emulsified in water and the liquid hardening agent component may be present in the water. In other cases, the liquid hardenable resin component may be emulsified in water and the liquid hardening agent component may be provided separately. Similarly, in other cases, the liquid hardenable resin component and the liquid hardening agent component may both be emulsified in water.

Any surfactant compatible with the hardening agent and capable of facilitating the coating of the resin may be used in the liquid hardening agent component. Suitable surfactants include, but are not limited to, alkyl phosphonate surfactants (e.g., C12-C22 alkyl phosphonate surfactants), an ethoxylated nonyl phenol phosphate ester, one or more cationic surfactants, and one or more nonionic surfactants. Combinations of one or more cationic and nonionic surfactants also may be suitable. The surfactant or surfactants may be included in the liquid hardening agent component in an amount ranging between about 1% to about 10% by weight of the liquid hardening agent component.

Examples of hydrolyzable esters that may be used in the liquid hardening agent component include, but are not limited to, a combination of dimethylglutarate, dimethyladipate, and dimethylsuccinate; dimethylthiolate; methyl salicylate; dimethyl salicylate; dimethylsuccinate; and any combination thereof. When used, a hydrolyzable ester may be included in the liquid hardening agent component in an amount ranging between about 0.1% to about 3% by weight of the liquid hardening agent component. In some cases, a hydrolyzable ester may be included in the liquid hardening agent component in an amount ranging between about 1% to about 2.5% by weight of the liquid hardening agent component.

Other resins suitable for use in the present disclosure are furan-based resins. Suitable furan-based resins include, but are not limited to, furfuryl alcohol resins, furfural resins, combinations of furfuryl alcohol resins and aldehydes, and a combination of furan resins and phenolic resins. A furan-based resin may be combined with a solvent to control viscosity, if desired. Suitable solvents for use with a furan-based resin include, but are not limited to, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. In some cases, the furan-based resins may be capable of enduring temperatures well in excess of 350° F. without degrading. In some cases, the furan-based resins suitable for use in the cases of the present disclosure are capable of enduring temperatures up to about 700° F. without degrading.

Optionally, the furan-based resins may further comprise a curing agent to facilitate or accelerate curing of the furan-based resin at lower temperatures. Examples of suitable curing agents may include organic or inorganic acids, such as, for example, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid, and any combination thereof. In some instances where a curing agent is not used, the furan-based resin may cure autocatalytically.

Still other resins suitable for use in the present disclosure are phenolic-based resins. Suitable phenolic-based resins include, but are not limited to, terpolymers of phenol, phenolic formaldehyde resins, and a combination of phenolic and furan resins. A phenolic-based resin may be combined with a solvent to control viscosity, if desired. Suitable solvents include, but are not limited to, butyl acetate, butyl lactate, furfuryl acetate, and 2-butoxy ethanol.

Yet another resin material suitable for use in the present disclosure is a phenol/phenol formaldehyde/furfuryl alcohol resin comprising about 5% to about 30% phenol, about 40% to about 70% phenol formaldehyde, about 10% to about 40% furfuryl alcohol, about 0.1% to about 3% of a silane coupling agent, and about 1% to about 15% of a surfactant. Suitable silane coupling agents include, but are not limited to, N-2-(aminoethyl)-3-aminopropyltrimethoxysilane, 3-glycidoxypropyltrimethoxysilane, and any combination thereof. Suitable surfactants include, but are not limited to, an ethoxylated nonyl phenol phosphate ester, combinations of one or more cationic surfactants, and one or more nonionic surfactants and an alkyl phosphonate surfactant.

In some instances, the resin is a curable resin comprising a liquid bisphenol A-epichlorohydrin resin, a 4,4'-diaminodiphenyl sulfone hardening agent dissolved in a diethylene glycol monomethyl ether solvent, a silane coupling agent, and a surfactant for facilitating the coating of the resin on the proppant particle. Such curable resins are described in U.S. Pat. Nos. 6,668,926, 6,729,404, and 6,962,200. For example, resins which can be utilized include, but are not limited to, organic resins such as bisphenol A-epichlorohydrin resin, polyepoxide resin, novolak resin, polyester resin, phenol-aldehyde resin, urea-aldehyde resin, furan resin, urethane resin and mixtures thereof. The resin is included in an amount in the range of from about 50% to about 90% by weight, or in an amount of about 85%. Examples of silane coupling agents which can be used include, but are not limited to, N-2-(aminoethyl)-3-aminopropyltrimethoxysilane and 3-glycidoxypropyltrimethoxysilane. The silane coupling agent is included in the resin in an amount in the range of from 0% to about 5% by weight of the curable resin, or in an amount of about 2%. Examples of solvents for the resin and silane coupling agent in the resin include, but are not limited to, methanol, butyl alcohol and N-methyl-2-pyrrolidone. The amount of the solvent utilized is in the range of from about 1% to about 10% by weight, or in an amount of about 5%. A commercially available resin is the "EXPEDITE®" product sold by Halliburton Energy Services, Inc. of Duncan, Okla.

In some instances, the tackifying agent comprises predominately a condensation reaction produce of a dimer acid containing some trimer and higher oligomers and some monomer acids with a polyamine (the polyamine can be a hylenediamine, diethylenetriamine, triethylenetetraamine, tetraethylene pentaamine and aminoethylipiperazine). These types of tackifying agents are described in U.S. Pat. Nos. 5,853,048, 5,833,000, 5,582,249, 5,775,425, 5,787,986, and 7,131,491. Examples of tackifying agents suitable for use in the present disclosure include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. An example of a suitable commercially available tackifying agent is the SANDWEDGE® product sold by Halliburton Energy Services, Inc.

Generally, to achieve the desired at least partial coating of the tackifying agent or resin onto the particulates, the tackifying agent or resin is present in the range of a lower limit of about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2%, 3.1%, 3%, 2.9%, 2.8%, 2.7%, 2.6%, and 2.5% by volume/weight percent (v/w %) of the proppant particles, encompassing any value and subset there between.

In some instances, the range may be, but may not necessarily be, tighter, such as in the range of about 0.1% to about 4%, or about 0.1% to about 3%, or about 0.1% to about 2%, or about 0.1% to about 1%, without departing from the scope of the present disclosure. Higher ranges may also be suitable, without departing from the scope of the present disclosure. The amount of stabilization agent selected, as discussed previously, may depend on the coating amount on the particle desired, cost concerns, and the like.

Biocides

Biocides are incorporated onto the multifunctional proppants to suppress bacterial growth. In some instances, the biocide can comprise or consist of biocidal nanoparticles. In other instances, the biocide may be an oxidizing biocide and/or a nonoxidizing biocide, but all types of biocides are envisioned. Combinations of biocides are also contemplated. With respect to biocidal nanoparticles, in some cases, transition metal nanoparticles and their metal oxides, may be used. The term "biocidal nanoparticles" will be used herein to describe nanoparticles having capability for suppressing the growth of one or more types of bacteria. The term "nanoparticles" will be used herein to refer to a particulate material having an equivalent spherical diameter of about 1000 nm or less in size, although suitable nanoparticles need not necessarily be spherical in shape. Particularly advantageous nanoparticles may have an equivalent spherical diameter of about 100 nm or less in size. Suitable nanoparticle shapes can include, for example, spheroids, toroids, platelets, rods, and the like.

Although localization of the biocidal nanoparticles is a desirable feature of the present disclosure, it can eventually be advantageous to release the biocidal nanoparticles from the multifunctional proppant in a controlled manner. For example, controlled release of the biocidal nanoparticles may eventually result in their conveyance to a subterranean region that was not initially experiencing bacterial growth. Controlled release of the biocidal nanoparticles may be accomplished by including a degradable material as part of the multifunctional proppant. For example, within a biocidal coating or by making the binder material (e.g., the tackifying agent and/or resin) itself degradable. Degradation of the biocidal binder material may also promote release of the multifunctional proppant from the propped fractures at an intended time or increase the porosity of a proppant pack, for example. When only a component within the biocidal coating is degradable, but not the binder material itself, the coating's porosity may be desirably increased by forming voids or channels within the coating but without substantially releasing the biocidal nanoparticles therefrom. Thus, tailoring of the biocidal coating may desirably impact a number of its properties, including mechanical strength, compressibility, porosity, biocidal activity, biocidal specificity and the like.

In some cases, compositions of the present disclosure can include a plurality of biocidal nanoparticles dispersed within a binder material (e.g., a tackifying agent and/or resin). Such compositions may be in the form of a coating, which may be used for localizing the biocidal nanoparticles within a subterranean formation. In some cases, the coating may be disposed upon proppant particles, thereby forming a composition comprising biocidal proppant particles.

Biocidal nanoparticles that may be used in the present disclosure include metal nanoparticles, metal oxide nanoparticles, metal halide nanoparticles, non-metal nanoparticles, and any combination thereof. Transition metal nanoparticles and their metal oxides and other salts may be particularly suitable. Specific biocidal nanoparticles that may be used in include, for example, silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, alloys thereof and any combination thereof Although any size of biocidal nanoparticles may be used, smaller nanoparticles may provide for more effective suppression of bacterial growth. In some cases, the biocidal nanoparticles can have a size of about 100 nm or under. In other cases, the biocidal nanoparticles can have a size of about 50 nm or under. In still other instances, the biocidal nanoparticles can have a size of about 25 nm or under, or a size of about 10 nm or under. In some instances, the biocidal nanoparticles may have a minimum size of about 1 nm.

The choice of a particular type or size of biocidal nanoparticles to be included in the present compositions may be dictated, at least to some degree, upon the type or species of bacteria whose growth is to be suppressed using the biocidal nanoparticles. The quantity of bacteria and their location in a subterranean formation may also at least partially dictate the choice of a particular biocidal nanoparticle for use in a given application. Such considerations lie within the purview of one having ordinary skill in the art and will not be discussed in further detail herein. It is therefore to be recognized that the biocidal nanoparticles or a combination of biocidal nanoparticles can be chosen at will when practicing the teachings of the present disclosure in order to address a particular downhole condition.

Similarly, the type, species, quantity and/or location of bacteria in a subterranean environment may also dictate, at least to some degree, the quantity of multifunctional proppant particles that are present in the compositions described herein. In some cases, the biocidal nanoparticles may comprise about 10% or less of the biocidal coating by weight, or about 5% or less of the biocidal coating by weight. When disposed on proppant particulates, the biocidal proppant particles may comprise about 5% or less of the biocidal coating by weight, or about 1% or less of the biocidal coating by weight.

In some cases, the loading of the biocidal coating onto the proppant particulates may be chosen so that the biocidal nanoparticles maintain an exposed surface within the biocidal coating. That is, the biocidal coating thickness may be chosen to be less than or equal to the effective size of the biocidal nanoparticles. In other cases, thicker biocidal coatings may be used, wherein the coatings have a degree of porosity that is sufficient to convey an exposed surface to the biocidal nanoparticles dispersed within the binder material.

More traditional biocides can also be used and include, for example, both oxidizing biocides and nonoxidizing biocides. Examples of oxidizing biocides may include sodium hypochlorite, hypochlorous acid, chlorine, bromine, chlorine dioxide, and hydrogen peroxide. Traditional oxidizing biocides include chlorine; hypochlorite; hypochlorite salts (such as sodium-, lithium-, or calcium-hypochlorite); bromine; hypobromite salts (such as sodium-, lithium-, or calcium-hypobromite), bromine chloride; hydroxyl radicals; chlorine dioxide; hydrogen peroxide; sodium hydroxide; and hydrogen peroxide. Traditional organic nonoxidizing biocides known for use in oilfield applications include chloramines; tetrahydro-3,5-dimethyl-2H-1,3,5-thiadiazine-2-thione; 5-chloro-2-methyl-4-isothiazolin-3-one; 2-methyl-4-isothiazolin-3-one; 1,2-benzisothiazolin-3-one; tetrakis (hydroxymethyl)phosphonium sulfate; zinc pyrithione; 2-(thiocyanomethylthio)benzothiazole; 2,2-dibromo-3-nitropropionamide; benzalkonium chloride; benzyl C10-16 alkyldimethyl ammonium chloride; didecyl-dimethyl-ammonium chloride; formaldehyde; glutaraldehyde; N-coco alkyl-1,3-propylenediamine acetate; hexahydro-1,3,5-triethyl-s-triazine; alkyl-aryl triethylammonium chloride solution; methylene bis(thiocyanate); 2,2-dibromo-nitrilopropionamide; 2-bromo-2-nitropropane-1,3-diol; 2-methyl-5-nitroimidazole-1-ethanol; quaternary ammonium glutaraldehyde; biguanidine; alkyl dimethyl benzyl ammonium chloride (ADBAC); dialky; dimethyl ammonium chloride (DDAC); and tetrakishydroxymethyl phosphonium sulfate (THPS).

Examples of non-oxidizing biocides may include aldehydes (such as formaldehyde and glutaraldehyde), quaternary amines, isothizaolines, carbamates, phosphonium quaternary compounds, and halogenated compounds (such as dibromonitrilopropionamide and bromonitropropanediol). Examples of suitable biocides may include those commercially available from Halliburton Energy Services Inc., in Duncan, Okla., under the trade names "ALDACIDE® G," "BE3™," "BE6™," and "BE7™."

Factors that determine what biocide will be used in a particular application may include but are not limited to, the cost and performance characteristics of the biocide. An additional factor that may be considered is the kill time of the biocide. For example, a biocide with a kill time of less than 5 minutes may be more desirable than a biocide with a kill time of 30 minutes for on the fly treatment. Other factors that may be considered are costs, compatibility with friction reducers, environmental compatibility, and regional drilling practices. One skilled in the art with the benefit of this disclosure will be able to choose a suitable biocide for a particular application in view of these considerations.

A biocide enhancer may be used in the fluids of the present disclosure to enhance the effectiveness of the chosen biocide. Suitable examples of a biocide enhancer include, but are not limited to, a surfactant selected from the group consisting of: quaternary surfactants, betaines, amine oxides, alkyl amines, alkyl aryl amines, alkyl aryl ethoxylates, and amine ethoxylates. Combinations of these may be suitable as well. Suitable examples of biocide enhancers may include surfactants and nonemulsifiers available from Halliburton Energy Services, Duncan, Okla. under the tradenames "EFS-2," "EFS-3," "19N™," and "HC-2™." While not being limited by a particular theory, it is believed that a biocide enhancer may penetrate the cell walls of the bacteria or slime agents, thereby enabling the biocide to more effectively deal with the bacteria. The biocide enhancer may also make it easier for the biocide to penetrate the walls of the bacteria. The biocide enhancer may also act as a wetting agent for the biocide.

In some instances, the biocide is tri-n-butyl tetradecyl phosphonium chloride (TTPC), which in some instances can be combined with one other type(s) of biocides. For example, TTPC, a fast acting biocide, may be combined with a slower acting biocide to provide an initial bioburden reduction followed by a sustained bioburden reduction. One such suitable combination is TTPC with tetrahydro-3,5-dimethyl-2H-1,3,5-thiadiazine-2-thione in the form of AMB-100, a long term liquid antimicrobial agent containing 24% tetrahydro-3,5-dimethyl-2H-1,3,5-thiadiazine-2-thione in a true solution that is readily dispersible in water (available from Sooner Energy Services, a Flotek Company, in Norman, Okla.).

Breakers

Breakers can be incorporated onto proppant particles to make the multifunctional proppants of the instant disclosure. The breakers can be included with the biocides in one layer around the proppant particles, or the breakers can form a separate layer on at least a portion of the proppant particles. All types of breakers known in the art are contemplated, including, for example, oxidative breakers, acid breakers, delayed release acid breakers, delayed release enzyme breakers, temperature activated breakers, hydrolysable ester breakers, and any combination thereof.

Examples of suitable delayed release enzyme breakers may include, but are not limited to, alpha and beta amylases, exo- and endo-glucosidases, amyloglucosidase, oligoglucosidase, invertase, maltase, cellulase, hemicellulase, endoglucosidase, endo-xylanase, exo-xylanase, and the like, and any combination thereof. In some cases, the enzyme breakers are enzymes or combinations of enzymes that attack the glucosidic linkages of a cellulose gelling agent backbone and degrade the gelling agent into mostly monosaccharide and disaccharide units. Temperature activated breakers may activate by being heated by the subterranean zone in which they are placed, or by another external heat source. Examples of suitable temperature activated breakers may include, but are not limited to, alkaline earth metal peroxides, such as calcium peroxide and magnesium peroxide, zinc peroxide, and the like, and any combination thereof. Examples of suitable hydrolysable esters may include, but are not limited to, sorbitol, catechol, dimethyl glutarate and mixtures of dimethyl glutarate, dimethyl succinate, dimethyl adipate, and the like, and any combination thereof.

An example of a suitable breaker is VICON NF™ breaker, a chlorous acid and sodium chloride breaker, available from Halliburton Energy Services, Inc. in Houston, Tex.

In some cases, the breaker is selected from the group consisting of calcium hypochlorite and alkali metal chlorites or hypochlorites in at least partially water soluble form. Further, the breaker can be any alkali metal bromate, alkaline earth metal bromate or other compound or material containing bromate ion which is capable of releasing the bromate ion. The breaker may be sodium bromate and/or potassium bromate.

Generally, to achieve the desired at least partial coating of the breaker onto the particulates to form the multifunctional proppants of the present disclosure, the breaker is present in the range of a lower limit of about 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, and 1% to an upper limit of about 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1.05%, and 1% by volume/weight percent (v/w %) of the particulates, encompassing any value and subset there between. In some cases, the range may be, but may not necessarily be, tighter, such as in the range of about 0.1% to about 1.5%, or about 0.1% to about 1%, or about 0.1% to about 0.5%, without departing from the scope of the present disclosure. Higher ranges may also be suitable, without departing from the scope of the present disclosure. Generally, however, the amount of breaker required is less than that generally required when the breaker is not associated (i.e., coated) onto the multifunctional particles of the instant disclosure.

Cross-Linking Agents

Cross-linking agents may be included in the multifunctional proppants of the instant disclosure. The crosslinking agent may be pre-coated onto the multifunctional particles or the particles may be coated on-the-fly at the wellsite. Crosslinking agents are used in an amount sufficient to provide the desired degree of crosslinking between molecules of the gelling agent.

In some instances, the crosslinking agent may be a metal crosslinking agents, for example, a borate ion, a metal ion, or similar component that is capable of crosslinking at least two molecules of a gelling agent. Examples of suitable metal crosslinking agents include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and any combination thereof.

In some instances, the crosslinking agent may be a polymeric crosslinking agent, such as, for example, a multifunctional boronic crosslinking agent. In some instances, the multifunctional boronic acid crosslinking agents may be capable of crosslinking the fluid at or close to a neutral pH. In some instances, the multifunctional boronic acid crosslinking agents of the present disclosure may comprise a polymeric backbone with a boronic acid functional group attached at one or more points along the polymer chain. In some instances, the multifunctional boronic acid cross agents may comprise a copolymer that comprises at least one boronic acid monomer unit and at least one water-soluble monomer unit. In some instances, the multifunctional boronic acid crosslinking agents may comprise a random copolymer of at least one boronic acid monomer unit and at least one water-soluble monomer unit, particularly a random copolymer in which the boronic acid monomer units are distributed over substantially all of the polymer chain length. In alternative instances, the multifunctional boronic acid crosslinking agents may comprise a copolymer that is a gradient copolymer. In other instances, the multifunctional boronic acid crosslinking agents can comprise a copolymer that is not a gradient copolymer. In some instances, the multifunctional boronic acid crosslinking agents of the present disclosure may comprise a copolymer that has less gradient copolymer character than a similar copolymer produced by conventional synthetic techniques.

In general, any boronic acid or boronate ester derived therefrom may be suitable for use in the multifunctional boronic acid crosslinking agents of the present disclosure. That is, the multifunctional boronic acid crosslinking agents of the present disclosure can contain a boronic acid group (e.g., —B(OH)2) or a boronate ester derived therefrom. In some instances, the boronic acids may be aryl boronic acids, particularly vinyl aryl boronic acids. A suitable aryl boronic acid that can be suitable for practicing the present disclosure may include, but is not limited to, 4-vinylphenylboronic acid or its positional isomers. Other substituted aryl boronic acids containing a polymerizable functional group (e.g., alkene) and optional functionality on the aryl ring (e.g., alkyl groups, halogens, carbonyl groups, amines, hydroxyl groups, carboxylic acids and their derivatives, and the like) may also be used, if desired. In other instances, the boronic acids containing a polymerizable functional group may be alkyl, alkenyl, or alkynyl boronic acids (i.e., aliphatic boronic acids) in which the alkyl, alkenyl, or alkynyl groups can contain optional substitution, if desired.

In some instances, a polymeric multifunctional boronic acid crosslinking agent may be a block copolymer including, but not limited to, a diblock, triblock or multiblock copolymer. A polymeric multifunctional boronic acid crosslinking agent may also be a copolymer of various monomers and can also be in the form of comb, brush, or dentritic shaped polymer. In some instances, the multifunctional boronic acid crosslinking agents of the present disclosure can be water-soluble.

An exemplary structure of a dendrimeric multifunctional boronic acid crosslinking agent is shown in Formula VII, where R is an organic group.

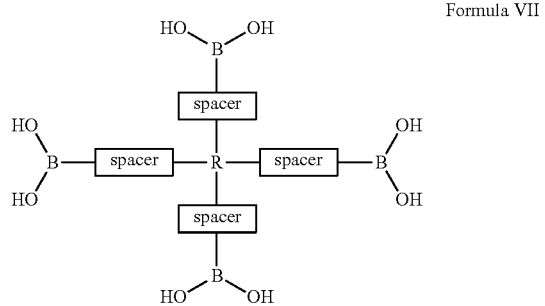

Formula VII

As used herein, the terms "dendritic polymers" or "dendrimers" refer to polymers which are distinguished by a branched structure. Dendrimers (e.g., cascade polymers, arborols, isotropically branched polymers, isobranched polymers, starburst polymers) generally are macromolecules which are uniform at the molecular level and have a highly symmetrical structure. Dendrimers are derived structurally from the star polymers, the individual chains in turn each being branched in a star-like manner. They can form from small molecules by a constantly repeating reaction sequence, resulting in one or more branches, on the ends of which there are in each case functional groups which in turn are starting points for further branching. Thus, the number of functional terminal groups multiplies with each reaction step. A characteristic feature of the dendrimers is the number of reaction steps (generations) carried out for their synthesis. Owing to their uniform structure, dendrimers can have as a rule a defined molar mass. In some instances, the multifunctional boronic acid crosslinking agents of the present disclosure may be dendrimeric in nature with about 2 to about 10 generations. In another case, the dendrimeric multifunctional boronic acid crosslinking agents may have about 2 to about 5 generations. In some instances, the dendrimeric multifunctional boronic acid crosslinking agents can generally have a molecular weight between about 1,000 Daltons and 10,000 Daltons.

As used herein, the term "star polymer" refers to polymers in which three or more chains extend from a center moiety. The center moiety can be a single atom or a group of atoms. Star polymers can be produced either by polymerization from multifunctional cores or by post modification reactions. Polymerization from a multifunctional core can be desirable for high molecular weight polymers. Star polymer synthesis by post modification reactions is well known in the art.

The dendritic or star polymeric multifunctional boronic acid crosslinking agents may comprise any suitable monomer units and/or spacer units (e.g., "R" or "spacer" in Formula VII) that result in a suitable crosslinking agent. In some instances, the monomer units can be water-soluble. For example, Formula VII illustrates a dendritic multifunctional boronic acid crosslinking agent with at least one generation that may have up to four boronic acid functional groups. In some instances with at least 2 generations, the dendritic multifunctional boronic acid crosslinking agents can have up to eight boronic acid functional groups in the outer generation. In addition to the boronic acid functional group, spacer units can comprise a polymer or oligomer synthesized from at least one water-soluble monomer unit that may include, but is not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, a quaternary salt derivative of acrylamide, a quaternary salt derivative of acrylic acid, alkyl acrylate, alkyl methacrylate, alkyl acrylamide, alkyl methacrylamide, alkyl dimethylammoniumethyl methacrylate halide, alkyl dimethylammoniumpropyl methacrylamide halide, any derivative thereof, and any combination thereof.

Suitable spacer units may also comprise any suitable linkage moieties, including, but not limited to, an amide, ester, ether, phosphate esters, amide, acetal, ketal, orthoester, carbonate, anhydride, silyl ether, alkene oxides, ether, imine, ether ester, ester amide, ester urethane, carbonate urethane, amino acids linkage, and any combination thereof. Suitable spacer units may also comprise any suitable linkage moieties, including but not limited, to an alkane, a polyethylene amine, a polyethylene oxide, a polyester, polycarbonate, polyurethane, polyphosphate esters, polyamides, polyacetals, polyketals, polyorthoesters, polyanhydrides, polysilyl ethers, polyalkene oxides), polyethers, polyimines, poly (ether esters), poly(ester amides), poly(ester urethanes), poly(carbonate urethanes), and poly(amino acids), and any combination thereof.

In addition to water-soluble monomer units and/or spacer units, one or more hydrophobic and/or hydrophilic monomer units or polymers comprising hydrophobic monomers may also be present in the interior generations of the dendrimer so long as any hydrophobic monomer units do not interfere with the function of the crosslinking agent in the treatment fluids described herein. In some instances, the multifunctional boronic acid crosslinking agents can have a ratio of boronic acid functional groups to monomers on the outer generation ranging from a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and any subset therebetween.

In some instances, the multifunctional boronic acid crosslinking agents may be a difunctionalized molecule. A suitable difunctionalized molecule structure may include, but is not limited to, the structure generally represented by Formula VIII, where R1 is an organic group.

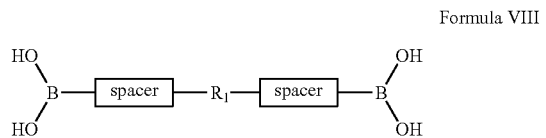

Formula VIII

In Formula IIIV, R1 and/or the spacer(s), alone or in combination, may be a functional group, a monomer, and/or a polymer with an average molecular weight in the range of about 200 Daltons to about 2,000,000 Daltons. The spacer(s) may be a small oligomer, a functional group, or a polymer suitable for connecting the monomer or polymer R1 to the boronic acid functional group. Suitable spacer units may comprise any suitable moieties, including, but not limited to, an amide group, an ester group, or an ether group. Suitable polymers useful as spacer units may include, but are not limited to, polyalphaolefins, polyaryletherketones, polybutenes, polyimines, polycarbonates, polyesters, aromatic polyamides, ethylene vinyl acetate polymers, polyacetals, polyethylenes, polyethylene oxides, polypropylenes, polymethylpentene, polyphenylene oxide, polystyrene, any derivative thereof, and any combination thereof. In some instances, the multifunctional boronic acid crosslinking agents of the general structure shown in Formula VIII may be a water-soluble polymer and may comprise any number of suitable monomer units that do not interfere with the crosslinking of the boronic acid groups with the gelling agent in the treatment fluids herein.

The multifunctional boronic acid crosslinking agents may also be a copolymer. Suitable copolymer structures may include, but are not limited to, the structure generally represented by Formula IX, where X represents a functionality bound to a monomer unit of the polymer backbone. Although Formula IX has indicated a regular spacing between boronic acid monomer units, it is to be recognized that the spacing of boronic acid monomer units can be regular in some instances or random in other instances.

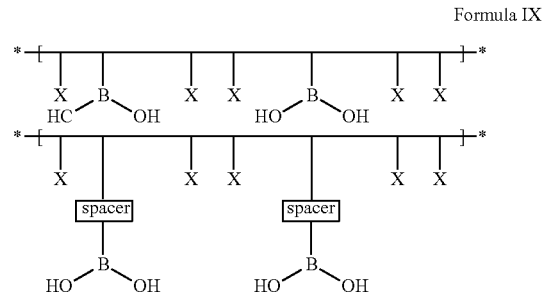

Formula IX

In some instances, the multifunctional boronic acid crosslinking agent may comprise a copolymer that comprises at least one boronic acid monomer unit and at least one water-soluble monomer unit. In some instances, the multifunctional boronic acid crosslinking agent may comprise a random copolymer of at least one boronic acid monomer unit and at least one water-soluble monomer unit. In some instances, the multifunctional boronic acid crosslinking agent may comprise a copolymer that is a gradient copolymer. Formula X shows a structure of an illustrative but non-limiting gradient copolymer containing monomer units A and B.

Formula X

In some instances, the multifunctional boronic acid crosslinking agent may comprise a copolymer that is not a gradient copolymer. An illustrative but non-limiting non-gradient copolymer may have a structure shown in Formula XI below, where A presents a monomer unit comprising a boronic acid functionality.

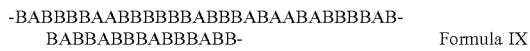

Formula IX

In some instances, the multifunctional boronic acid crosslinking agent may comprise a copolymer that has a reduced gradient copolymer character. For example, a multifunctional boronic acid crosslinking agent having a reduced gradient copolymer character might have only about 5 B monomer units on its chain termini, as compared to 15 B monomer units in Formula X.

In some instances, a copolymer comprising the multifunctional boronic acid crosslinking agent may comprise at least one water-soluble monomer unit. Suitable water-soluble monomer units may include, but are not limited to, an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniummethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

In various instances, a copolymer comprising the multifunctional boronic acid crosslinking agent may comprise at least one boronic acid monomer unit, particularly a boronic acid monomer unit containing a polymerizable vinyl, allyl, or acrylic functional group. In some instances, the at least one boronic acid monomer unit may comprise an aryl boronic acid. In other instances, the at least one boronic acid monomer unit may comprise an alkyl, alkenyl or alkynyl boronic acid (i.e., aliphatic boronic acids). It should be noted that the classification of a boronic acid as aryl, alkyl, alkenyl, or alkynyl refers to the point of attachment of the boronic acid group. That is, for example, an aryl boronic acid has a boronic acid or a boronate ester derivative thereof attached to an aryl ring, and an alkenyl boronic acid has a boronic acid or boronate ester derivative thereof attached to an alkenyl group. As previously noted, a boronic acid may have additional functionality elsewhere in the molecule. For example, an aryl boronic acid may have an alkenyl functionality elsewhere in the molecule that is not attached to the boronic acid functionality.

In some instances, the multifunctional boronic acid crosslinking agent may be a block copolymer including, but not limited to, a diblock, triblock or multiblock copolymer. An exemplary suitable diblock copolymer structure may include, but is not limited to, the structure generally represented by Formula XII, where m and n are integers and X represents a functionality bound to a monomer unit of the polymer backbone:

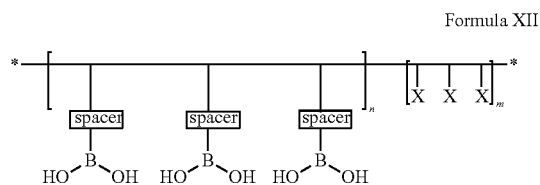

Formula XII

In various instances, the copolymers and block copolymers of Formulas IX through XII can have an average molecular weight between about 1,000 Daltons and about 2,000,000 Daltons. For the multifunctional boronic acid crosslinking agents having the general structures shown in Formulas IX through XII, the monomers within the polymer structure may be any suitable monomers that result in a water-soluble polymer molecule and do not interfere with the crosslinking of the boronic acid group with a gelling agent. Formulas IX and XIII illustrate that a boronic acid functional group may be directly bonded to the backbone of the polymer and/or the boronic acid functional group may be connected to the polymer backbone with an intervening spacer group.

In some instances, a multifunctional boronic acid crosslinking agent of the general structure shown in Formula IX, can be synthesized by polymerization of a vinyl monomer containing a boronic acid functional group (e.g., 3-acrylamidophenyl boronic acid) and any suitable water-soluble monomer containing a vinyl group including, but not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, alkyl dimethylammoniumpropyl methacrylamide halides, any derivatives thereof, and any combinations thereof. Other functional groups may also be present along the polymer backbone. In some instances, the boronic acid functional group may be grafted onto an already formed polymer backbone using techniques known to one having ordinary skill in the art. In some instances, as generally represented by Formulas IX and XII, the ratio of the boronic acid monomer units to the other monomer units in the polymer may range from about 1:1 to about 1:200.

In some instances, the multifunctional boronic acid crosslinking agents of the present disclosure may comprise an equilibrium species. For example, the multifunctional boronic acid crosslinking agents may become protonated or deprotonated depending on pH. This feature can influence their solubility in the treatment fluids described herein. Likewise, intramolecular interactions between atoms in the multifunctional boronic acid crosslinking agents of the present disclosure and the geometry of boron (e.g., tetrahedral or trigonal planar) can depend on pH and/or solvent (e.g., an alcohol-based solvent such as methanol). Thus, the exact chemical composition and geometry of the multifunctional boronic acid crosslinking agents of the present disclosure may depend on a particular equilibrium known to one of ordinary skill in the art. The geometry may also depend on the neighboring group participation in changing the steoreochemistry. For example, a nitrogen atom present in a neighboring group may share its lone pair of electrons with a boron to result in a tetrahedral geometry, which may allow for the formation of a bond to hydroxyl groups at a relatively neutral pH.

In some instances, a multifunctional boronic acid crosslinking agent may be prepared by incorporation of one or more of the monomer units listed above in the polymer synthesis with a boronic acid monomer unit. Formula XIII illustrates an example of the present disclosure, where x and y are integers and R is a hydrogen or an alkyl, alkenyl, alkynyl, aryl, heteroaryl, or cycloalkyl group. For example, a multifunctional boronic acid crosslinking agent according to Formula XIII may be prepared by copolymerizing 3-acrylamidophenylboronic acid with an acrylamide monomer unit (e.g., N,N-dimethylacrylamide) in the ratio of about 1:1 to about 1:200 (e.g., a ratio of x:y ranging from about 1:1 to about 1:200) by free radical polymerization to provide the multifunctional boronic acid crosslinking agent.

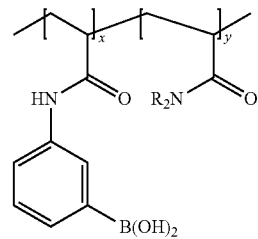

Formula XIII

In another illustrative case, a multifunctional boronic acid crosslinking agent can be prepared by copolymerizing 4-vinylphenylboronic acid and acrylamide. Such a copolymer has a structure represented by Formula XIV.

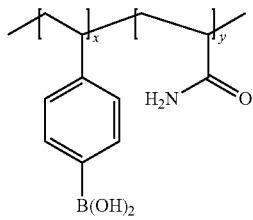

Formula XIV

In some instances, the 4-vinylphenylboronic acid may be protected as a boronate ester such as, for example, a polyol boronate ester. Such a copolymer has a structure represented by Formula XV. It should be understood that any vicinal hydroxyl groups in the polyol can react with the boronic acid, and the indicated structure in Formula XV should be considered illustrative in that regard. That is, other isomers can be formed. In both Formulas XIV and XV, x and y are integers. As previously noted, the solubilizing groups (e.g., the polyol) may be removed at some point after the synthesis of the copolymer to liberate the free boronic acid groups for crosslinking.

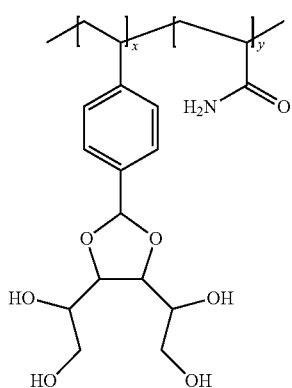

Formula XV

In yet another illustrative case, the multifunctional boronic acid crosslinking agent can comprise a compound represented by Formula XVI, where x and y are integers and R is a hydrogen or an alkyl, alkenyl, alkynyl, aryl, heteroaryl, or cycloalkyl group. In this case, the multifunctional boronic acid crosslinking agent may be prepared by copolymerizing 2-((2-acrylamidoethylamino)methyl)phenylboronic acid and an acrylamide in the ratio of about 1:1 to about 1:200 (e.g., a ratio of x:y ranging from about 1:1 to about 1:200 in Formula X) by free radical polymerization.

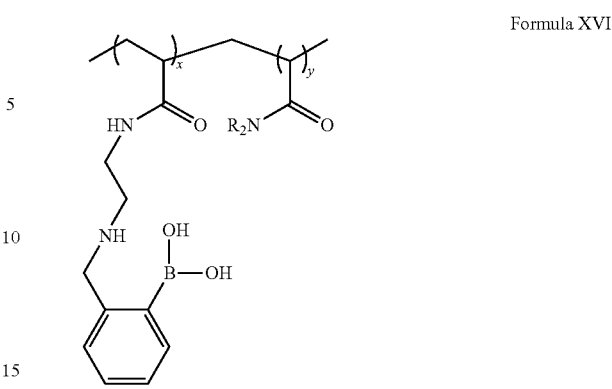

Formula XVI

In still another illustrative case, the multifunctional boronic acid crosslinking agent may be a difunctional boronic crosslinking agent having Formula XVII, where u is an integer and R comprises a carbon, nitrogen, oxygen or sulfur atom. For example, when R is O or NH, the difunctional boronic acid crosslinking agent of Formula XVI may be prepared by reacting two equivalents of 2-formylphenylboronic acid with one equivalent of oligomeric ethylene oxide or oligomeric ethylenediamine followed by reduction of the intermediate imine. The reduction of the intermediate imine may be conducted using reductive amination techniques that are known to one having ordinary skill in the art.

The crosslinking agents of the present disclosure may be provided or used in any suitable form. For instance, the crosslinking agents can be a liquid, a gel, an emulsion, a powder (e.g., a fine powder), or a solid. The form of the crosslinking agent may depend on the specific choice of the material for forming the crosslinking agent, the type of stabilizing agent selected, the type of treatment operation, and the like.

Generally, the crosslinking agent may be present in an amount sufficient to be at least partially coated onto the particulates and to provide sufficient crosslinking reactivity with the gelling agent to suspend the multifunctional proppants in the fracturing fluid, as described herein. In some instances, the crosslinking agent may be present in an amount in the range of from a lower limit of about 0.0001%, 0.00025%, 0.0005%, 0.00075%, 0.001%, 0.0025%, 0.005%, 0.0075%, 0.01%, 0.025%, 0.05%, 0.075%, 0.1%, 0.25%, 0.5%, 0.75%, and 1% to an upper limit of about 5%, 4.75%, 4.5%, 4.25%, 4%, 3.75%, 3.5%, 3.25%, 3%, 2.75%, 2.5%, 2.25%, 2%, 1.75%, 1.5%, 1.25%, and 1% by weight of the particulates to be at least partially coated, encompassing any value and subset therebetween. In those cases in which additional crosslinking agent(s) are included in the treatment fluid in a form that is not coated onto the particulates, the crosslinking agent may be present in an amount in the range of from a lower limit of about 0.0001%, 0.00025%, 0.0005%, 0.00075%, 0.001%, 0.0025%, 0.005%, 0.0075%, 0.01%, 0.025%, 0.05%, 0.075%, 0.1%, 0.25%, 0.5%, 0.75%, and 1% to an upper limit of about 5%, 4.75%, 4.5%, 4.25%, 4%, 3.75%, 3.5%, 3.25%, 3%, 2.75%, 2.5%, 2.25%, 2%, 1.75%, 1.5%, 1.25%, and 1% by weight of the treatment fluid.

ILLUSTRATIONS

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

Figure 2:
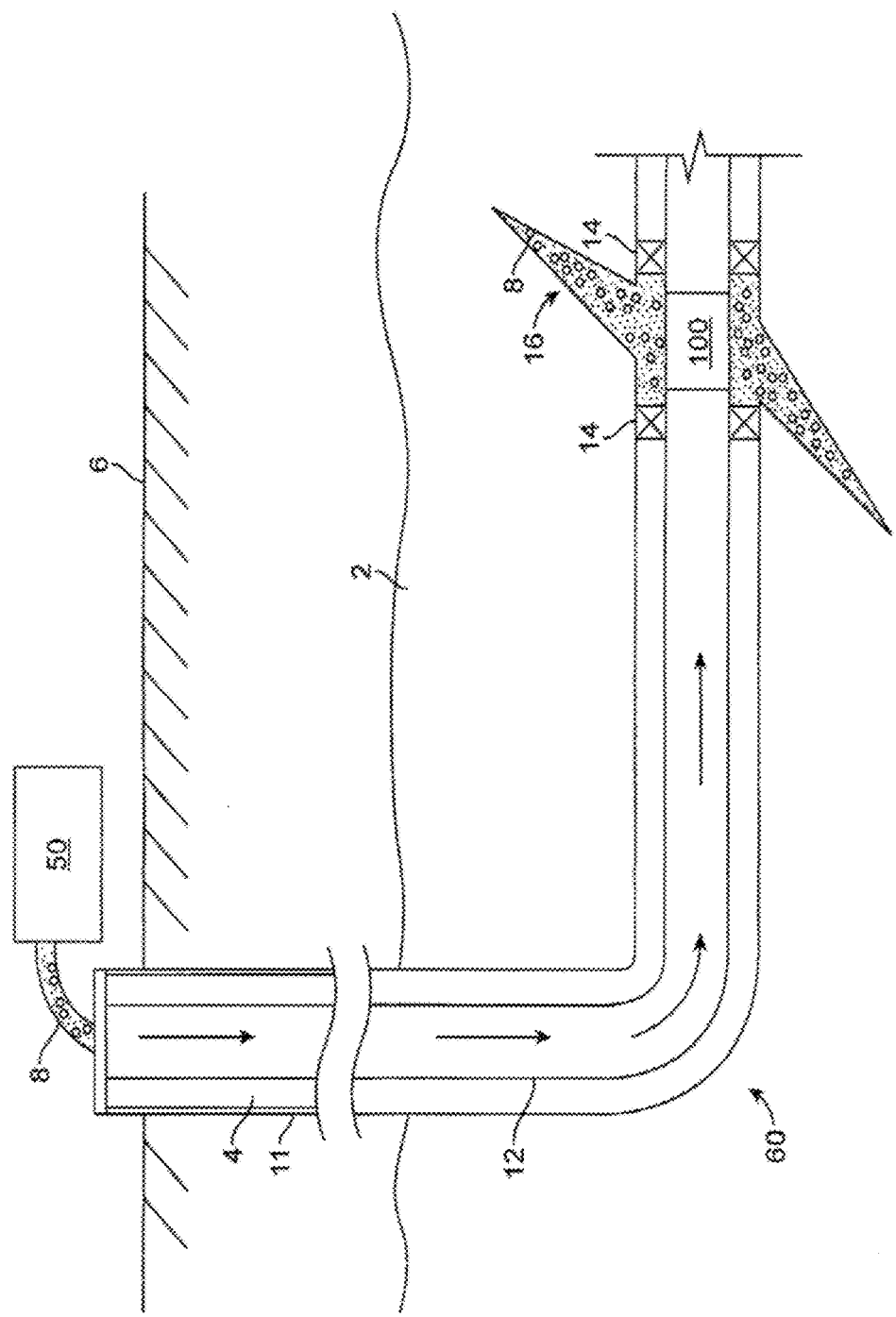
FIG. 2 is a diagram illustrating an example of a subterranean formation in which a fracturing operation may be performed in association with certain aspects of the present disclosure.

The exemplary methods and compositions disclosed herein may directly or indirectly affect one or more components or pieces of equipment associated with the preparation, delivery, recapture, recycling, reuse, and/or disposal of the disclosed compositions. For instance, an exemplary fracturing system is illustrated in FIGS. 1 and 2. In this example, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used in fracturing the formation, for example, by being pumped through a work string 12 and a multi-acting downhole tool 100 (see FIG. 2) when in the open configuration. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include the multifunctional proppants as disclosed herein, as well as other proppants, and can be combined with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 and out through the multi-acting downhole tool 100 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids using continuous mixing or "on-the-fly" methods. Thus, for example, the pumping and blender system 50 can distribute fracturing fluid and/or proppant through the multi-acting downhole tool 100 to the target subterranean zone.

FIG. 2 illustrates a well 60 performing a fracturing operation in a portion of a subterranean formation of interest 2 surrounding a well bore 4. The well bore 4 extends from the surface 6, and the fracturing fluid 8 is applied to a portion of the subterranean formation 2 surrounding the horizontal portion of the well bore through, for example, the multi-acting downhole tool 100. The tool 100 can include ports, holes, or a sleeve which permits exit of fluid from the work string 12. Although shown as vertical deviating to horizontal, the well bore 4 may include horizontal, vertical, slant, curved, and other types of well bore geometries and orientations, and the fracturing treatment may be applied to a subterranean zone surrounding any portion of the well bore. The well bore 4 can include a casing 11 that is cemented or otherwise secured to the well bore wall. The well bore 4 can be uncased or include uncased sections. In cased wells, perforations can be formed using shape charges, a perforating gun, hydro-jetting and/or other tools.

The well is shown with a work string 12 depending from the surface 6 into the well bore 4. The pump and blender system 50 is coupled to the work string 12 to pump the fracturing fluid 8 into the well bore 4. The working string 12 may include coiled tubing, jointed pipe, and/or other structures that allow fluid to flow into the well bore 4. The working string 12 can include flow control devices that control the flow of fluid from the interior of the working string 12 into the subterranean zone 2.

The working string 12 and/or the well bore 4 may include one or more sets of packers 14 that seal the annulus between the working string 12 and well bore 4 to define an interval of the well bore 4 into which the fracturing fluid 8 will be pumped. FIG. 2 shows two packers 14, one defining an uphole boundary of the interval and one defining the downhole end of the interval. When the fracturing fluid 8 is introduced into well bore 4 at a sufficient hydraulic pressure, one or more fractures 16 may be created in the subterranean zone 2. The proppant particulates in the fracturing fluid 8 may enter the fractures 16 where they may remain after the fracturing fluid flows out of the well bore. These proppant particulates may "prop" fractures 16 such that fluids may flow more freely through the fractures 16.

Figure 3:
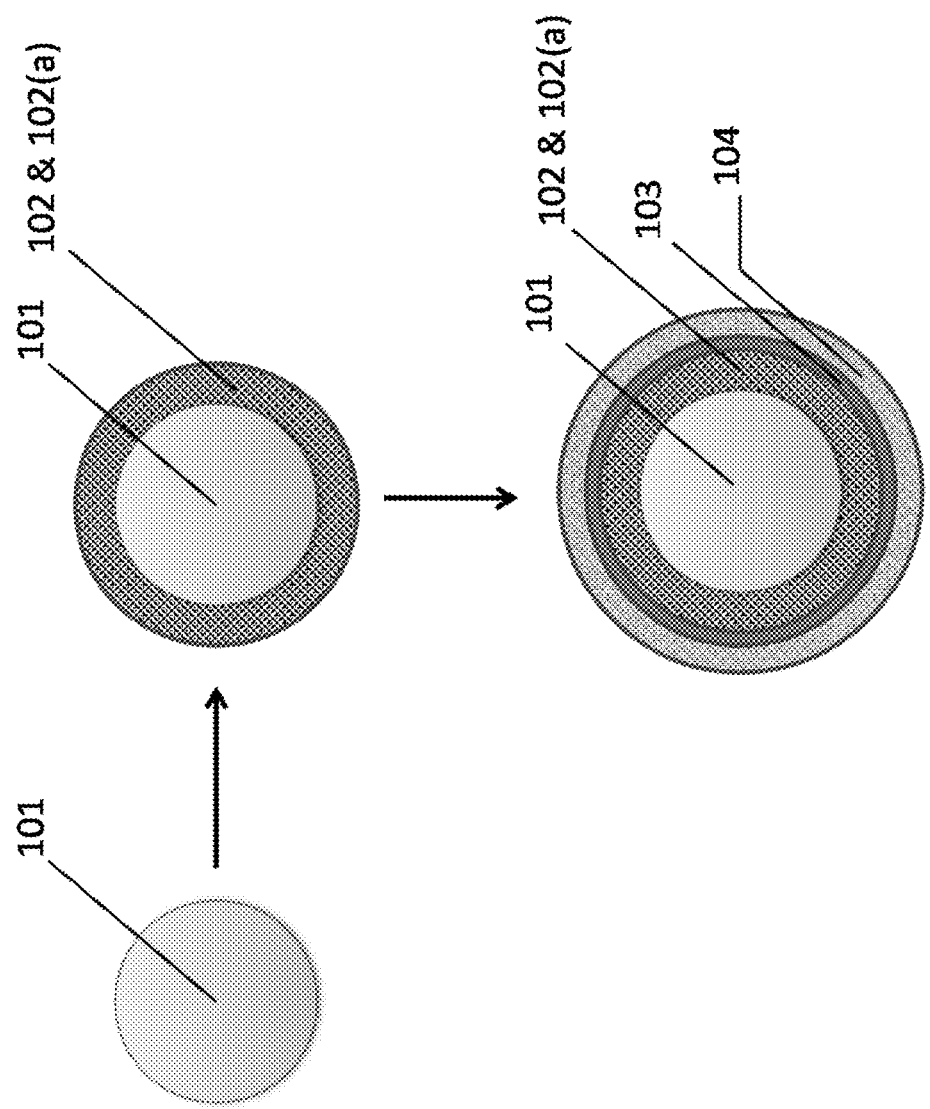
FIG. 3 is an illustration of a proppant particle being coated with a biocide, a breaker, and a cross-linking agent.

FIG. 3 illustrates a multifunctional proppant particle. A proppant particle 101 is initially coated with a curable resin (e.g., Expedite® fracturing service) or a tackifying agent (e.g., Sandwedge® system) 102 having metallic nanoparticles 102(a) dispersed therein. The metallic nanoparticles 102(a) act as a biocide to protect the proppant particle 101 from bacterial growth. Breaker 103 is also applied to proppant particle 101. The breaker 103 appears as a separate layer in FIG. 3. Nonetheless, the breaker 103 can be mixed with the biocide 102(a) and dispersed throughout the resin or tackifying agent 102, or can be a separate and distinct layer surrounding at least a portion of the proppant particle 101. Finally, FIG. 3 shows a cross-linking agent 104 that is applied to the proppant particle 101. FIG. 3 shows cross-linking agent 104 as a separate and distinct layer on the outside of the multifunctional proppant particle. The cross-linking agent 104 does not, however, necessarily need to be a separate and distinct layer limited to the outside of the multifunctional proppant particle. For example, the cross-linking agent 104 could be applied with the breaker 103 to at least part of the proppant particle 101. Typically, in practice, it is desirable for the cross-linking agent to be released or available to cross-link the fracking fluid early in order to increase the viscosity of the fracking fluid (e.g., to "gel" the fracking fluid). This allows the fracking fluid to carry the proppant to the desired location where the breaker can become available to reduce the molecular weight of the various polymers used in the fracking fluid. The "breaking" of the fracking fluid reduces the viscosity and facilitates the blowback of residual polymer for cleanup. The biocide (e.g., the metallic nanoparticles) remains on the proppant particle 101 and prevent the buildup of bacteria on the proppant particle.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLE 1

47.9 grams of 20/40 Northern White sand (4 lb/gal) is used as proppant particles. The sand is then coated with 0.479 gm (1% w/w) of Sandwedge® NT system. 0.0479 grams (0.1% w/w) of silver nanoparticles (Aldrich product, 739448: Silver nanowires diam.xL 115 nm×20-50 µm, 0.5% (isopropyl alcohol suspension)) are coated onto the Sandwedge® NT coated sand particles. Then, 0.0479 gm (0.1% w/w) Sodium Persulfate breaker and 0.0958 gm (0.2% w/w) CL-22UC borate crosslinker are applied to form multifunctional proppant particles.

The multifunctional particles are then added to a carrier fluid prepared by hydrating 0.24 gm (20 lb/1000 gal) guar gelling agent in 100 mL water. The carrier fluid pH is adjusted to 10.5 using carbonate-based buffering agent (BA-40L).

Sandwedge® NT system, BA-40L, and CL-22UC are Halliburton products. Sandwedge® NT system is a tackifying agent. BA-40L carbonate-based buffering additive is used to raise the pH of aqueous based gels. Cl-22UC crosslinker is an oil-based slurry of borate minerals.

Statements of the disclosure include:

Statement 1: A multifunctional proppant comprising proppant particles that are at least partially coated with: a biocide; a breaker; and a cross-linking agent.

Statement 2: A multifunctional proppant according to Statement 1, wherein the proppant particles are selected from the group consisting of sand, bauxite, a ceramic material, a glass material, a polymer material, a polytetrafluoroethylene material, a nut shell piece, a cured resinous particulate comprising nut shell pieces, a seed shell piece, a cured resinous particulate comprising seed shell pieces, a fruit pit piece, a cured resinous particulate comprising fruit pit pieces, a wood, a composite particulate, and any combination thereof.

Statement 3: A multifunctional proppant of Statement 1 or Statement 2, wherein the biocide is biocidal nanoparticles.

Statement 4: A multifunctional proppant of any one of the preceding Statements 1-3, wherein the biocidal nanoparticles are metal nanoparticles, metal oxide nanoparticles, metal halide nanoparticles, non-metal nanoparticles, or any combination thereof.

Statement 5: A multifunctional proppant of any one of the proceeding Statements 1-4, wherein the biocidal nanoparticles are selected from the group consisting of silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, and any combination thereof.

Statement 6: A multifunctional proppant of any one of the preceding Statements 1-5, wherein the biocide is an oxidizing biocide or a nonoxidizing biocide.

Statement 7: A multifunctional proppant of any one of the preceding Statements 1-6, wherein the biocide is attached to the proppant particle with tackifying agent or a resin that at least partially coats the proppant particles.

Statement 8: A multifunctional proppant of any one of the proceeding Statements 1-7, wherein the breaker is also attached to the proppant particle with the tackifying agent or a resin that at least partially coats the proppant particle.

Statement 9: A multifunctional proppant of any one of the preceding Statements 1-8, wherein the breaker is an oxidative breaker, an acid breaker, a delayed release acid breaker, a delayed release enzyme breaker, a temperature activated breaker, a hydrolysable ester breaker, or any combination thereof.

Statement 10: A multifunctional proppant of any one of the preceding Statements 1-9, comprising a cross-linking agent applied to the outside of the biocide and breaker.

Statement 11: A multifunctional proppant of any one of the preceding Statements 1-10, wherein the cross-linking agent is selected from the group consisting of an alkali metal borate, borax, boric acid, and a compound which is capable of releasing multivalent metal ions in aqueous solutions.

Statement 12: A multifunctional proppant of any one of the preceding Statements 1-11, wherein the biocide is attached to the proppant particle with a resin comprising a liquid bisphenol A-epichlorohydrin resin, a 4,4'-diaminodiphenyl sulfone hardening agent dissolved in a diethylene glycol monomethyl ether solvent, a silane coupling agent, and a surfactant for facilitating the coating of the resin on the proppant particle.

Statement 13: A multifunctional proppant of any one of the preceding Statements 1-12, wherein the biocide is attached to the proppant particle with a tackifying agent comprising predominately a condensation reaction produced of a dimer acid containing some trimer and higher oligomers and some monomer acids with a polyamine.

Statement 14: A multifunctional proppant of any one of preceding Statements 1-13, wherein the polyamine is a ethylenediamine, diethylenetriamine, triethylenetetraamine, tetraethylene pentaamine and aminoethylipiperazine.

Statement 15: A fracturing fluid comprising the multifunctional proppant of any one of preceding Statements 1-14.

Statement 16: A fracturing fluid of Statement 14 comprising about 0.1 lbm to 20 lbm of the multifunctional proppant of claim 1 per gallon of fracturing treatment fluid.

Statement 17: A method for forming one or more fractures in a subterranean zone penetrated by a well bore and minimizing or inhibiting bacterial growth comprising: mixing the multifunctional proppant of any one of the preceding Statements 1-14 with a fracturing fluid; introducing the fracturing fluid mixed with the multifunctional proppant into a subterranean zone to form the one or more fractures and to deposit the proppant particles therein; and minimizing or inhibiting bacterial growth around the proppant particles.

Statement 18: A method of preceding Statement 17, wherein the cross-linking agent cross-links a gelling agent in the fracturing fluid for a sufficient amount of time to allow the fracturing fluid to carry the proppant particle to the desired location.

Statement 19: A method of preceding Statement 17 or Statement 16, wherein after the proppant particle is carried to the desired location, the breaker becomes available to solubilize the fracturing fluid.

Statement 20: A method of any one of the precedings Statements 17-19, wherein the biocide remains affixed to the proppant particle after the proppant particle is carried to the desired location to minimize or inhibit bacterial growth around the proppant particle.

Statement 21: A method of any one of the preceding Statements 17-20, wherein the fracturing fluid mixed with the multifunctional proppant is introduced into the subterranean zone using one or more pumps.

The foregoing descriptions of specific compositions and methods of the present disclosure have been presented for purposes of illustration and description. They are not intended to be exhaustive or to limit the disclosure to the precise compositions and methods disclosed and obviously many modifications and variations are possible in light of the above teaching. The examples were chosen and described in order to best explain the principles of the disclosure and its practical application, to thereby enable others skilled in the art to best utilize the disclosure with various modifications as are suited to the particular use contemplated. It is intended that the scope of the disclosure be defined by the claims appended hereto and their equivalents.

The invention claimed is:

1. A multifunctional proppant comprising:
    proppant particles that are at least partially coated with:
        a first layer including a biocide;
        a second layer including a breaker, the second layer applied outside of the first layer and fully encompassing the first layer; and
        a third layer including a cross-linking agent, the third layer applied outside of the second layer and fully encompassing the second layer,
    wherein the first layer, the second layer, and the third layer are separate and distinct layers.

2. The multifunctional proppant of claim 1, wherein the proppant particles are selected from the group consisting of sand, bauxite, a ceramic material, a glass material, a polymer material, a polytetrafluoroethylene material, a nut shell piece, a cured resinous particulate comprising nut shell pieces, a seed shell piece, a cured resinous particulate comprising seed shell pieces, a fruit pit piece, a cured resinous particulate comprising fruit pit pieces, a wood, a composite particulate, and any combination thereof.

3. The multifunctional proppant of claim 1, wherein the biocide is biocidal nanoparticles.

4. The multifunctional proppant of claim 3, wherein the biocidal nanoparticles are metal nanoparticles, metal oxide nanoparticles, metal halide nanoparticles, non-metal nanoparticles, or any combination thereof.

5. The multifunctional proppant of claim 3, wherein the biocidal nanoparticles are selected from the group consisting of silver nanoparticles, silver chloride nanoparticles, zinc nanoparticles, copper nanoparticles, iron nanoparticles, platinum nanoparticles, gold nanoparticles, titanium dioxide nanoparticles, selenium nanoparticles, germanium nanoparticles, lithium nanoparticles, and any combination thereof.

6. The multifunctional proppant of claim 1, wherein the biocide is an oxidizing biocide or a nonoxidizing biocide.

7. The multifunctional proppant of claim 1, wherein the biocide is attached to the proppant particle with a tackifying agent or a resin that at least partially coats the proppant particles.

8. The multifunctional proppant of claim 7, wherein the breaker is also attached to the proppant particle with the tackifying agent or the resin that at least partially coats the proppant particle.

9. The multifunctional proppant of claim 7, wherein the biocide is attached to the proppant particle with the resin comprising a liquid bisphenol A-epichlorohydrin resin, a 4,4'-diaminodiphenyl sulfone hardening agent dissolved in a diethylene glycol monomethyl ether solvent, a silane coupling agent, and a surfactant for facilitating the coating of the resin on the proppant particle.

10. The multifunctional proppant of claim 7, wherein the biocide is attached to the proppant particle with the tackifying agent comprising predominately a condensation reaction produced of a dimer acid containing some trimer and higher oligomers and some monomer acids with a polyamine.

11. The multifunctional proppant of claim 10, wherein the polyamine is a ethylenediamine, diethylenetriamine, triethylenetetraamine, tetraethylene pentaamine and aminoethylipiperazine.

12. The multifunctional proppant of claim 1, wherein the breaker is an oxidative breaker, an acid breaker, a delayed release acid breaker, a delayed release enzyme breaker, a temperature activated breaker, a hydrolysable ester breaker, or any combination thereof.

13. The multifunctional proppant of claim 1, wherein the cross-linking agent is applied to the outside of the biocide and breaker.

14. The multifunctional proppant of claim 1, wherein the cross-linking agent is selected from the group consisting of an alkali metal borate, borax, boric acid, and a compound which is capable of releasing multivalent metal ions in aqueous solutions.

15. The multifunctional proppant of claim 1, further comprising:
    a first separate and distinct adhesive layer made with a tackifying agent or a resin applied between the first layer and the second layer;
    a second separate and distinct adhesive layer made with the tackifying agent or the resin applied between the second layer and the third layer.

16. A fracturing fluid comprising the multifunctional proppant of claim 1.

17. The fracturing fluid of claim 16, comprising about 0.1 lbm to 20 lbm of the multifunctional proppant of claim 1 per gallon of fracturing treatment fluid.

18. A method for forming one or more fractures in a subterranean zone penetrated by a well bore and minimizing or inhibiting bacterial growth comprising:
    mixing the multifunctional proppant of claim 1 with a fracturing fluid;
    introducing the fracturing fluid mixed with the multifunctional proppant into a subterranean zone to form the one or more fractures and to deposit the proppant particles therein; and
    minimizing or inhibiting bacterial growth around the proppant particles.

19. The method of claim 18, wherein the cross-linking agent cross-links a gelling agent in the fracturing fluid for a sufficient amount of time to allow the fracturing fluid to carry the proppant particle to the desired location.

20. The method of claim 19, wherein after the proppant particle is carried to the desired location, the breaker becomes available to solubilize the fracturing fluid.

21. The method of claim 18, wherein the biocide remains affixed to the proppant particle after the proppant particle is carried to the desired location to minimize or inhibit bacterial growth around the proppant particle.

\* \* \* \* \*